United States Patent [19]
Houk

[11] Patent Number: 6,005,354
[45] Date of Patent: *Dec. 21, 1999

[54] BALLAST IC WITH SHUT-DOWN FUNCTION

[75] Inventor: Talbott M. Houk, Culver City, Calif.

[73] Assignee: International Rectifier Corporation, El Segundo, Calif.

[*] Notice: This patent is subject to a terminal disclaimer.

[21] Appl. No.: 08/907,136

[22] Filed: Aug. 6, 1997

Related U.S. Application Data

[60] Provisional application No. 60/028,838, Oct. 21, 1996.

[51] Int. Cl.$^6$ .................................................. H05B 41/00
[52] U.S. Cl. ...................... 315/225; 315/307; 315/209 R
[58] Field of Search .................................... 315/224, 307, 315/308, 291, 209 R, 225, 244, DIG. 7

[56] References Cited

U.S. PATENT DOCUMENTS

| | | | |
|---|---|---|---|
| 5,287,040 | 2/1994 | Lestician | 315/291 |
| 5,334,912 | 8/1994 | Counts | 315/119 |
| 5,365,118 | 11/1994 | Wilcox | 327/109 |
| 5,493,181 | 2/1996 | Shackie et al. | 315/241 R |
| 5,545,955 | 8/1996 | Wood | 315/224 |
| 5,550,436 | 8/1996 | Houk | 315/209 R |
| 5,747,943 | 5/1998 | Houk et al. | 315/224 |
| 5,783,908 | 7/1998 | Toda et al. | 315/308 |
| 5,796,215 | 8/1998 | Parry et al. | 315/307 |

FOREIGN PATENT DOCUMENTS

| | | |
|---|---|---|
| 0648068 | 8/1994 | European Pat. Off. . |
| 6252723 | 9/1994 | Japan . |
| 2211038 | 10/1987 | United Kingdom . |
| 2287143 | 2/1995 | United Kingdom . |

*Primary Examiner*—Don Wong
*Assistant Examiner*—Wilson Lee
*Attorney, Agent, or Firm*—Ostrolenk, Faber, Gerb & Soffen, LLP

[57] ABSTRACT

A MOS gate drive (MGD) integrated circuit drives a pair of MOS gated power semiconductor devices such as are used in a half bridge circuit to drive a load in a resonant power supply circuit or to drive a gas discharge lamp in a ballast circuit. The gate drive circuit includes a protection circuit which protects against damage to the components of the driver circuit when a lamp fails or is removed by disabling both of the driver outputs. When the lamp is replaced, the gate drive circuit restarts the lamp driver circuit without cycling the lamp power switch. The protection circuit disables the driver outputs when a low logic level signal falls below a threshold voltage. The lamp driver circuit is restarted when the low logic level signal exceeds the threshold voltage.

14 Claims, 6 Drawing Sheets

BALLAST IC WITH SHUT-DOWN FUNCTION

This application claims the benefit of U.S. Provisional Application Ser. No. 06/028,838, filed Oct. 21, 1996.

RELATED APPLICATIONS

This application is related to U.S. Pat. No. 5,612,597 entitled "OSCILLATING DRIVER CIRCUIT WITH POWER FACTOR CORRECTION, ELECTRONIC LAMP BALLAST EMPLOYING SAME AND DRIVER METHOD" issued Mar. 18, 1997, to U.S. Pat. No. 5,545, 955, entitled "MOS GATE DRIVER FOR BALLAST CIRCUITS" issued Aug. 13, 1996, to U.S. Pat. No. 5,559,394, entitled "MOS GATE DRIVER FOR BALLAST CIRCUITS", issued Sep. 24, 1996, all in the name of Peter N. Wood, and to U.S. Pat. No. 5,550,436, entitled "MOS GATE DRIVER INTEGRATED CIRCUIT FOR BALLAST CIRCUITS", issued Aug. 27, 1996, in the name of Talbott M. Houk, all of which are assigned to the assignee of the present application and incorporated herein by reference.

BACKGROUND OF THE INVENTION

The present invention relates to lamp ballast circuits, and, more particularly, to an improved lamp ballast circuit which protects against lamp failure.

Lamp ballast circuits, such as an International Rectifier IR2155 or IR2151 IC, are known and are described in U.S. Pat. Nos. 5,545,955 and 5,559,394 to Peter Wood and in U.S. Pat. No. 5,550,436 to Talbott M. Houk.

To properly shut down a ballast IC during certain lamp application failure modes, a means of turning off the gate driver outputs upon sensing fault conditions (such as a broken filament or a lamp which fails to strike at startup) and then turning off the output power transistors is needed.

Because of the topology of the IR2155 and IR2151 ICs, the circuits are self-oscillating under normal operation, as shown in FIGS. 1 and 2.

FIG. 1 shows the components of a typical lamp driver circuit. A bridge rectifier 10 derives a bus voltage ($V_{BUS}$) from the ac line. The bus voltage is approximately dc and is supported by capacitors 56 and 58.

The lamp driver circuit of FIG. 1 includes an MOS gate driver chip 30 and its associated circuitry for controlling the operation of a high side MOSFET 40 and a low side MOSFET 41. The MOS gate driver chip 30 provides drive signals to the MOSFETs 40 and 42 which are connected to $V_{BUS}$. Though power MOSFETs are shown, any power device which has a MOS gate, such as an IGBT or a MOS gated thyristor, may be substituted for power MOSFETs 40 and 42.

The output of the center tap of half bridge connected MOSFETs 40 and 42 drives a circuit that includes a series LC load circuit comprised of inductor 46 and capacitor 52.

The voltage supplied at terminal $V_{BUS}$ can range from as low as 140 volts d-c to above 600 volts d-c, depending upon the supplied AC input voltage.

The oscillating frequency of the output circuit is controlled by the resonant frequency of the inductor 46 and the capacitor 52. The desired inductance value of inductor 46 will depend on the value of the voltage $V_{BUS}$ and is selected so that the oscillation frequency of the circuit is within desired range.

The chip 30 may be housed in a 8-pin DIP or surface mount package and has the following pinouts:

$V_{CC}$—a pin which receives a chip operating voltage from the d-c supply $V_{BUS}$.

$C_T$—a single input control pin which is connected to the node between timing capacitor 14 and timing resistor 16. The signal at pin $C_T$ controls both outputs $H_O$ and $L_O$.

$R_T$—a pin which is connected to the other terminal of timing resistor 16.

$V_B$—a pin connected to the node of diode 22 and capacitor 24, which acts as a "bootstrap" circuit to provide power for the operation of the high side switch.

$H_O$—an output pin to the gate (or a resistor 26 to the gate) of the high side MOSFET 40.

$V_S$—a pin to the center tap of the totem-pole or half bridge connected MOSFETs 40 and 42.

$L_O$—an output pin to the gate (or a resistor 28 to the gate) of the low side MOSFET 42.

COM—a pin connected to the negative or ground terminal.

Resistor 18 and a capacitor 12 provide the IC 30 with its dc and ac power requirements. The resistor 16 and the capacitor 14 control the oscillation frequency according to the equation:

$$f = \frac{1}{1.4 R_{16} C_{14}}. \tag{1}$$

A diode 22 and a capacitor 24 form the "bootstrap" supply for the floating CMOS driver circuit within the IC. Resistors 26 and 28 dampen LC ringing on the gates of the power MOSFETS 40 and 42 and also serve to buffer the IC 30 from the power stage.

The load circuit, which includes the inductor 46 and the resonant capacitor 52, also includes blocking capacitors 56 and 58, a positive-temperature-coefficient (PTC) resistor 54, and a lamp 50. A capacitor 44 normally controls the dV/dt observed at the Vs node to minimize radiated EMI.

A drawback of this basic circuit is that if the lamp is either broken (such as at the end of its operating life) or is removed from the circuit, catastrophic failure of other components within the circuit may result. Therefore, users of the gate driver IC 30 must typically design additional external circuitry to sense the fault conditions and then turn off the IC. Preferably, both outputs of the gate driver IC turn off under a turn-off condition.

Because the gate driver IC is self-oscillating, one of the gate driver outputs $L_O$ and $H_O$–$V_S$ is always on, except for the short "deadtime" shown in FIG. 2. Under normal operating conditions, either the MOSFET 40 or the MOSFET 42 is on. As a result, turning off the gate driver IC simply by externally shunting the timing capacitor 14 to ground, as shown in FIG. 3, for example, is not sufficient to protect the circuit.

FIG. 3 shows the circuit of FIG. 1 modified to include a transistor 60 which shunts the input control capacitor 14 to ground when the lamp is removed. A voltage divider formed by resistors 62, 64, 66 and a capacitor 68 form the sensing circuit. Under normal operating conditions, the voltage at node $V_A$ is approximately equal to one-half the dc supply voltage, $V_{BUS}/2$, when capacitors 56 and 58 are of identical value. The only difference between the voltage at node $V_A$ and the voltage at the node located at the midpoint between capacitors 56 and 58 results from the voltage drop across the filament of the lamp 50.

Under normal operating conditions, the voltage drop across the filament is relatively small, namely only a few volts, and the voltage at node $V_C$ is insufficient to turn on the shunt transistor 60. If the lamp is removed, however, the voltage at node $V_A$ rises, as does the voltage at node $V_C$, such that the transistor 60 turns on. The values of the resistors 62, 64, 66 are chosen such that the circuit never turns on the transistor 60 during normal operating conditions but always turns on the transistor 60 when the lamp is removed or fails. The capacitor 68 also forms part of a low pass filter in the turn off response circuit, thereby increasing noise immunity.

The circuit shown in FIG. 3, however, does not shut down both of the power MOSFET devices 40 and 42 when the lamp is removed from the load circuit. Under this no-lamp load condition, the $C_T$ pin of IC 30 would be shunted to ground by the transistor 60, which halts the IC's internal oscillator and its output switching, as desired. However, despite having turned off the output of the half bridge, transistor 42 remains on.

Another approach to shutting down both MOSFETs 40 and 42 under a fault condition is to shunt the $V_{CC}$ pin of the IC ground, as shown in FIG. 4. Here, the sensing circuit is essentially the same as FIG. 3, but an SCR 70 shunts the $V_{CC}$ pin through resistor 72 to shut down the output.

A drawback of the circuit of FIG. 4 is that when the fault condition ends, such as when the lamp is replaced in its socket, the entire power-up sequence must be repeated because the supply voltage $V_{CC}$ that is supplied to the chip has been discharged below its undervoltage threshold. In fact, the circuit relies on the undervoltage lockout circuit of IC 30 to turn both of power transistors 40, 42 off.

Another drawback of the circuit of FIG. 4 is that the SCR 70 is a more expensive component than the NPN transistor 60 of FIG. 3.

Moreover, a resistor 72 must be included into the $V_{CC}$ capacitor discharge path to slow down the dV/dt at the $V_{CC}$ pin. The dV/dt must be limited because the supply voltage to the gate driver output stages may turn off before the output stages have fully discharged the gates of the power MOSFETs. For example, if the upper power MOSFET 40 is on and the supply voltage is rapidly brought to 0V, the transistor 40 cannot be turned off and is effectively left with a charge (or voltage) on its gate with only the inherent gate-to-source leakage to discharge the MOSFET. The residual charge can cause catastrophic failure if the IC 30 is restarted when the upper MOSFET 40 is still on. When the IC 30 restarts, namely, when its $V_{CC}$ voltage exceeds the rising undervoltage lockout threshold, the lower MOSFET 42 turns on first. If transistor 40 is still on when transistor 42 turns on, a short will be present across the dc bus and the ac line that will, at the very least, blow a fuse and more likely cause the failure of either one of or both of the power MOSFETs.

SUMMARY OF THE INVENTION

The present invention provides for a lamp driver integrated circuit which protects against damage to the components of driver circuit when a lamp fails or is removed by disabling both of the driver outputs.

When the lamp is replaced, the IC automatically restarts the lamp driver circuit without cycling the lamp power switch.

According to an aspect of the invention, an integrated circuit formed in a silicon substrate drives first and second MOS gated power semiconductor devices. The power semiconductor devices are connected in a half bridge circuit which has a first and second dc terminals and which has a common terminal located at a node between the first and second MOS gated power semiconductor devices. The common terminal supplies an output signal to a load circuit. A timer circuit has an input control terminal which is connected to a low logic level signal. A first latch circuit is coupled to the timer circuit and controls the frequency at which the first and second MOS gated power semiconductor devices are switched on and off and supplies an output which is switched on and off in response to the signal applied to the input control terminal. High side and low side dead time delay circuits are each coupled to the first latch circuit and delay transmission of the latch output signal for a time interval following the switching of the output of the latch circuit to prevent simultaneous conduction of the first and second MOS gated power semiconductor devices. High side and low side driver circuits are coupled to the high side and low side dead time circuits, respectively, and have high side and low side output terminals, respectively, which supply high side and low side outputs for turning off the respective first and second MOS gated power semiconductor devices in response to the signal supplied to the input control terminal. A protective circuit is coupled to the low logic level signal and prevents the supply of the high side and low side outputs when the low logic level signal is below a threshold value.

According to this aspect of the invention, the protective circuit may include a threshold voltage sensing circuit which is coupled to the low logic level signal and a second latch circuit which is coupled to the sensing circuit and whose outputs are supplied to the high side and low side dead time delay circuits. The threshold voltage may be less than the lowest value of the lower logic level signal voltage at which outputs are supplied for turning on and off the first and second MOS gated power semiconductor devices. When the low logic level signal falls below the threshold voltage, the high side and low side dead time delay circuits may be prevented from transmitting the latch output signal.

According to another aspect of the invention, a circuit drives a load circuit from a dc bus supply and includes first and second MOS gated power semiconductor devices and a self-oscillating driver circuit.

In accordance with a further aspect of the present invention, a circuit drives a gas discharge illumination device and includes first and second MOS gated power semiconductor devices and a self-oscillating driver circuit.

Other features and advantages of the present invention will become apparent from the following description of the invention which refers to the following drawings.

DETAILED DESCRIPTION OF THE INVENTION

Figure 1:
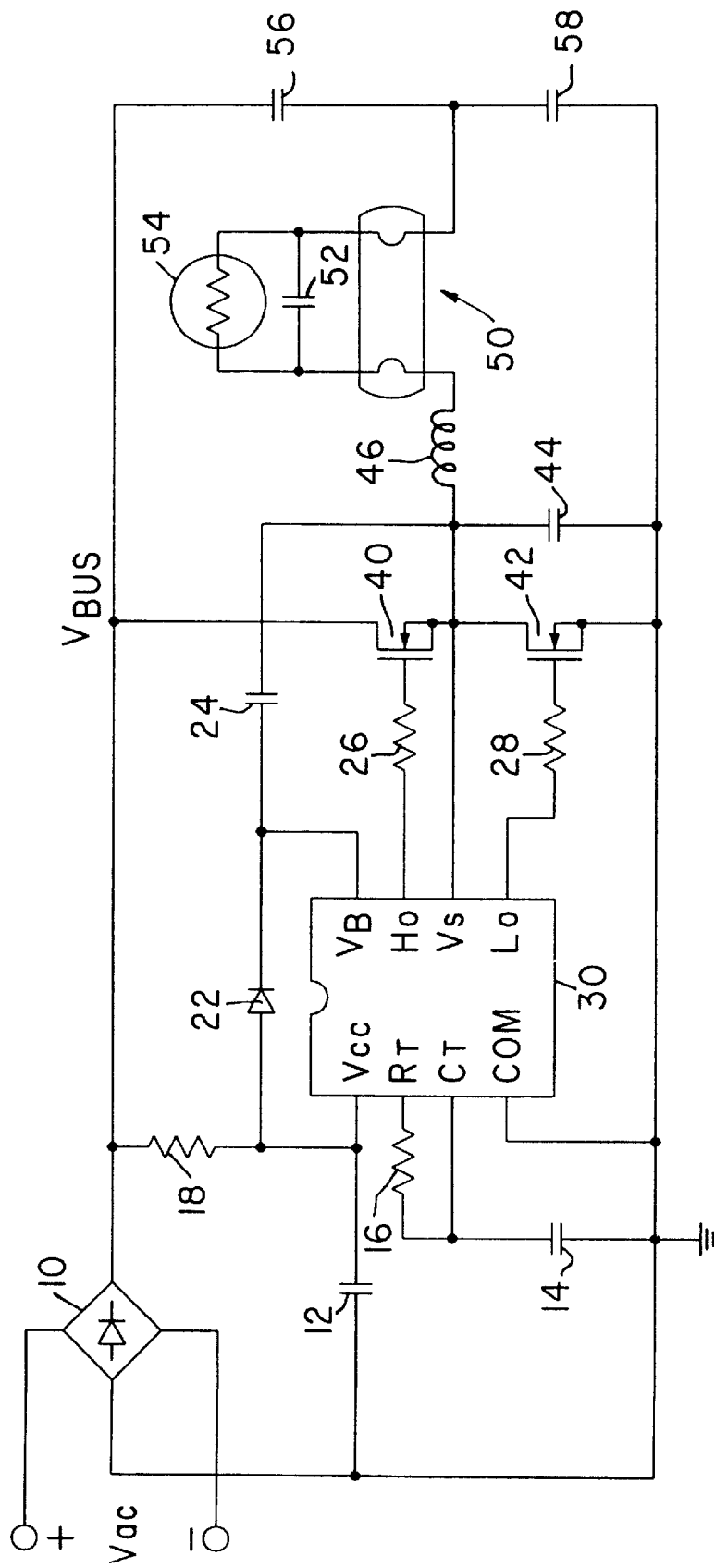
FIG. 1 is a diagram showing a typical known lamp ballast circuit.
Figure 2:
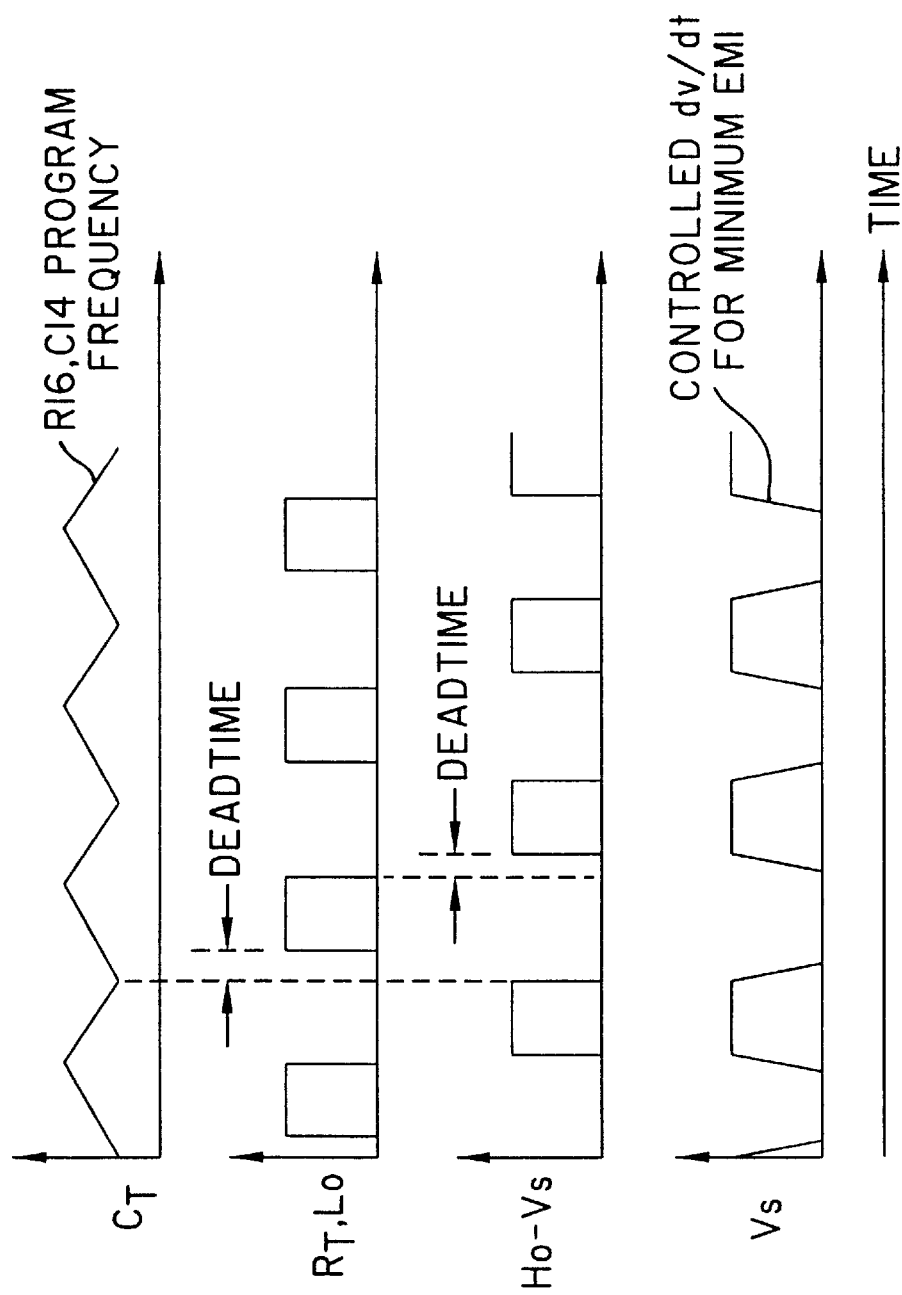
FIG. 2 shows the waveforms of the circuit shown in FIG. 1.
Figure 3:
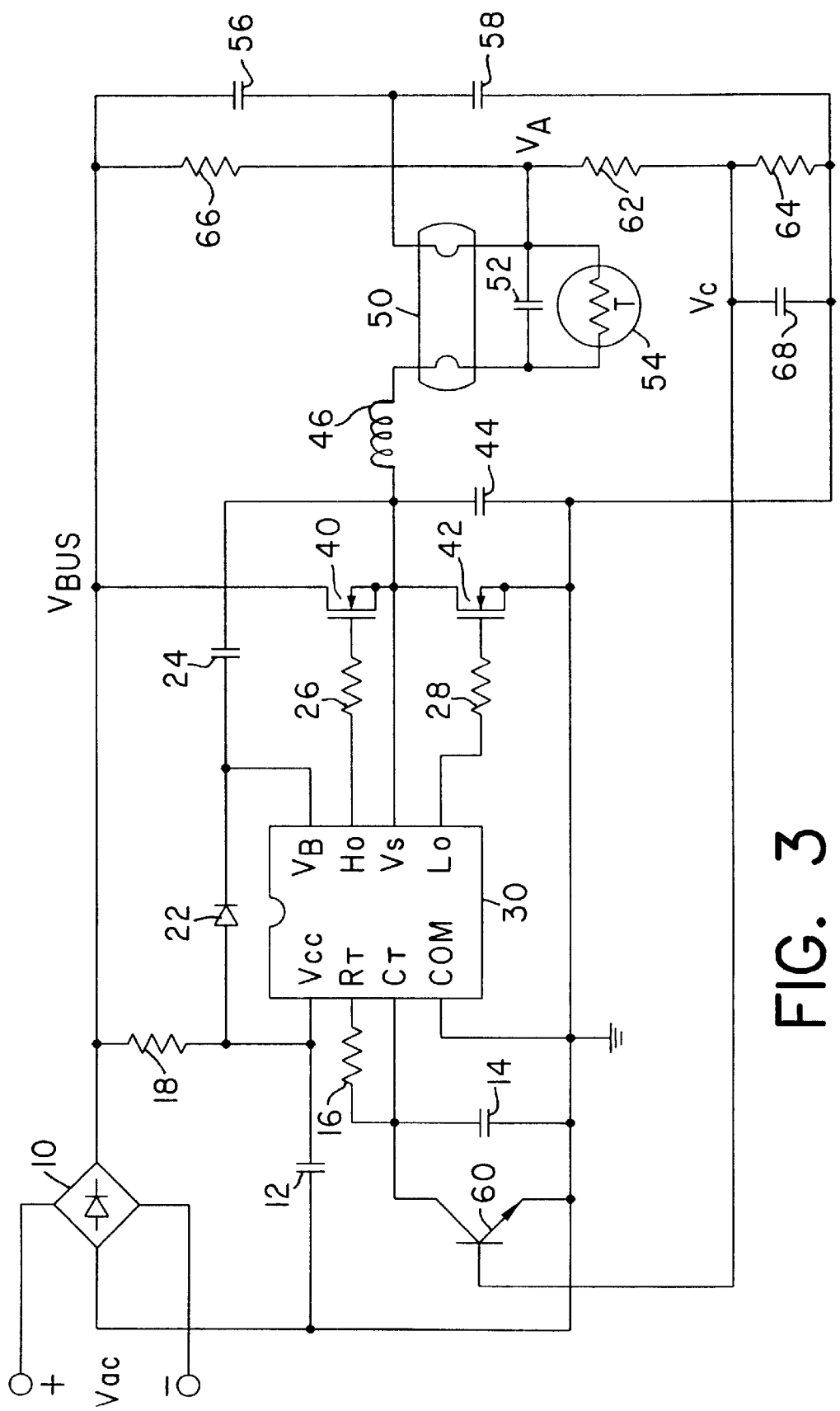
FIG. 3 shows a known lamp ballast circuit which includes a shunt transistor that disables the circuit in the event of lamp failure.
Figure 4:
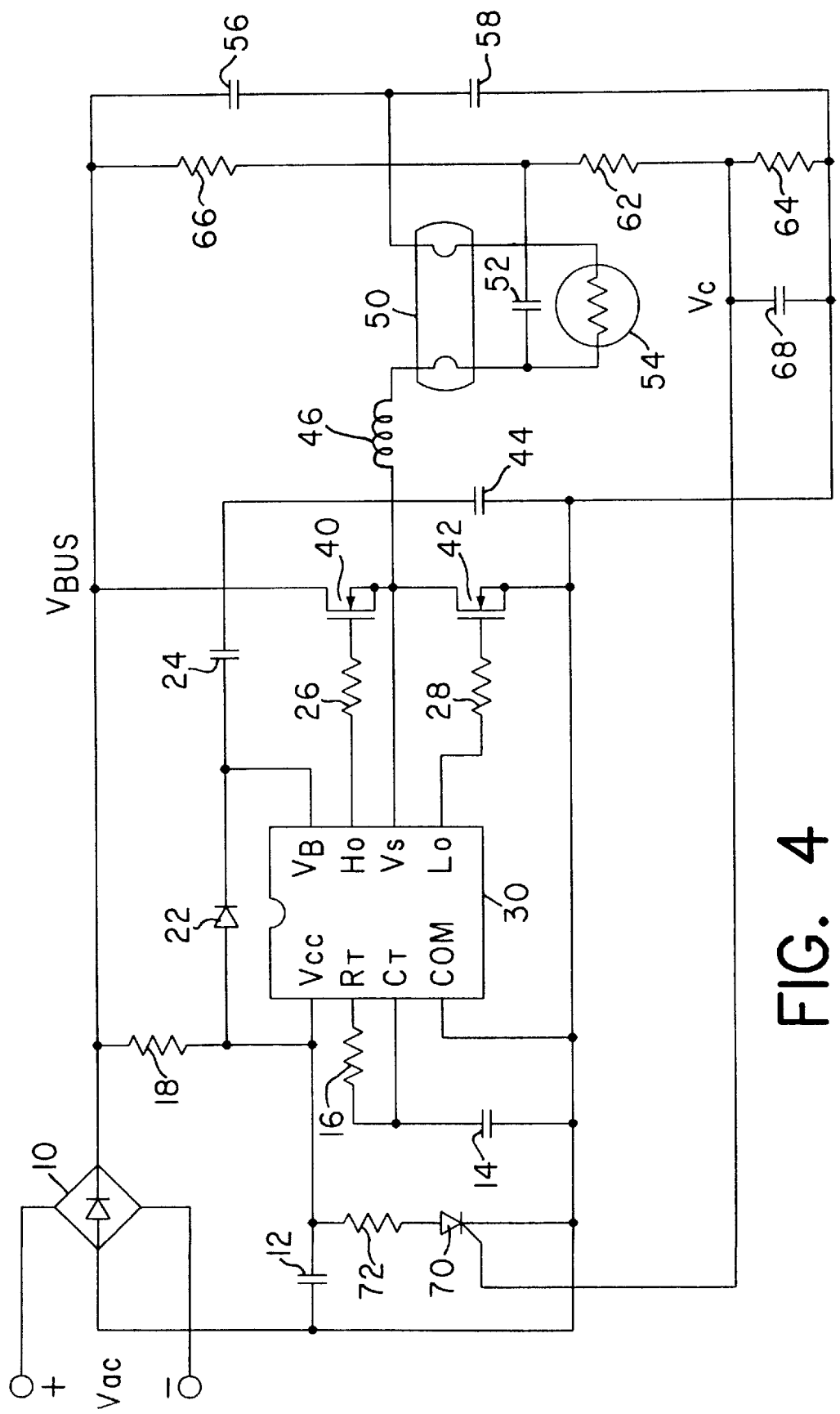
FIG. 4 shows a known lamp ballast circuit in which an SCR shunts the $V_{CC}$ pin in the event of a lamp failure.

The invention enables the use of the simple circuit, such as is shown in FIG. 3, by modifying the internal IC circuitry.

The circuit shown in FIG. 3, however, represents only one example of a shutdown circuit. Other similar circuits are also possible.

Figure 5:
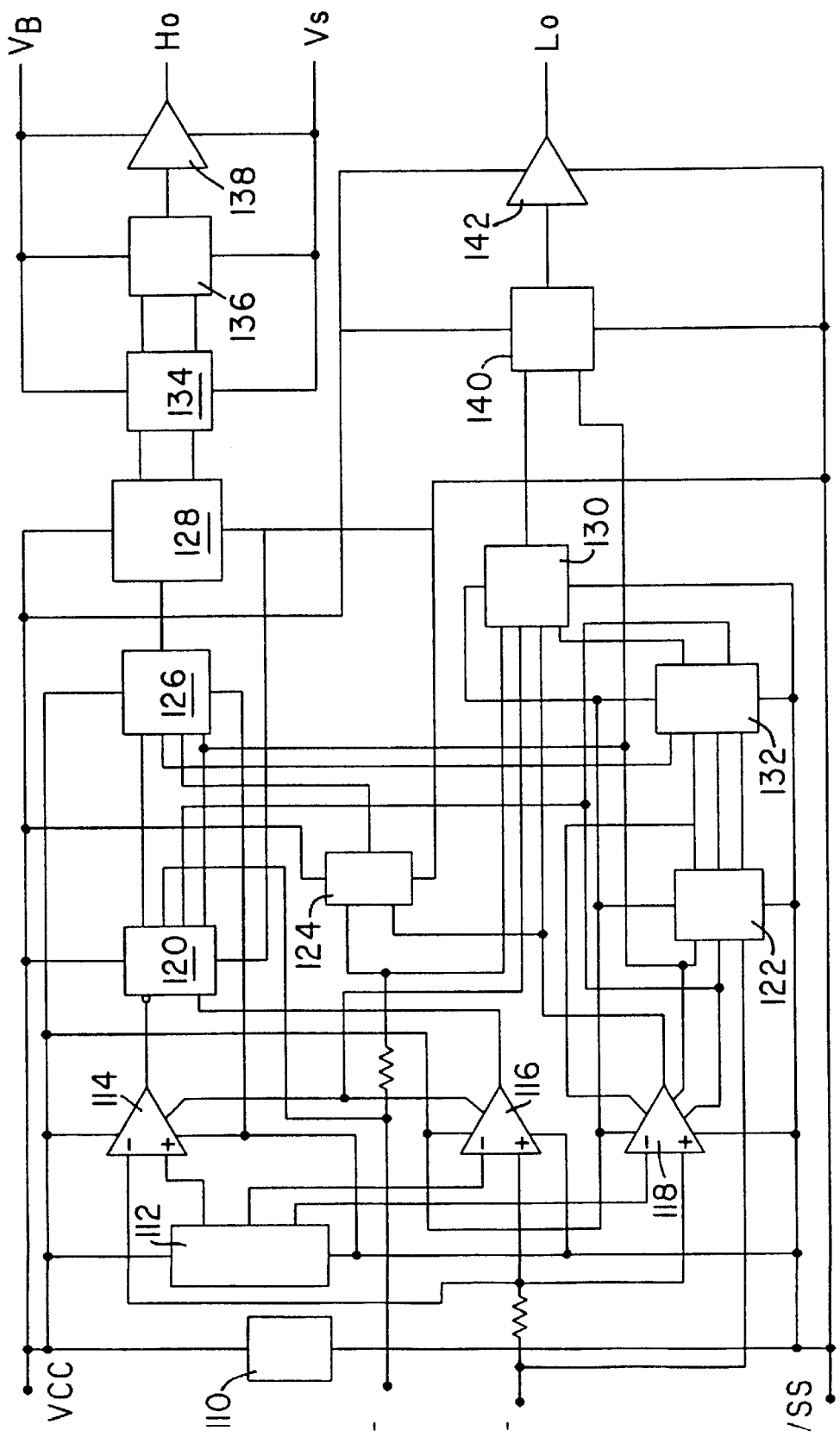
FIG. 5 shows a block diagram of a lamp driver integrated circuit according to an embodiment of the invention.

FIG. 5 is a block diagram of the circuit of the IC chip 30 of the invention that is suitable for inclusion in the circuit of FIG. 3. The eight pinouts of chip 30 are repeated in FIG. 5. All circuit blocks to be described in FIG. 5 are typically integrated into a common silicon chip.

The leftmost circuit block shown in FIG. 5 is the clamp circuit 110, typically comprising a plurality of zener diodes. The claim circuits connected from pin $V_{CC}$ and pin $V_{SS}$ which is connected to the silicon substrate which acts as the chip ground. A digital supply line and analog supply line both extend from pin $V_{CC}$. An analog ground line and a digital ground line are also connected to pin $V_{SS}$.

The next group of circuit blocks form a timer circuit. The blocks include a divider circuit 112, which is connected to the analog supply line and to the analog ground, an N comparator 114, a P comparator 116 and an RS latch 120. Two taps from divider 112 are connected to the positive inputs of comparators 114 and 116 and supply voltages VR1 and VR2, respectively, thereto. Input pin $C_T$ is connected to the negative input of comparators 116 and 114. The output of comparators 114 and 116 are connected to the RS latch 120 as shown.

The RS latch 120 is also connected to an under-voltage lock-out circuit 122 which is integrated into the chip circuit. Thus, if $V_{CC}$ reduces too low, the RS latch 120 is locked out.

A bias circuit 132 provides bias outputs to the lockout circuit 122, and to dead time delay circuits 126 and 130 in the high side and low side circuit lines. Dead time delay circuits 126 and 130 provide a dead time or delay of about 1 microsecond between the turn on of the high side or low side switch after the turn off of the other. This dead time ensures that a "shoot through" circuit cannot be formed in which both power MOSFETs 40 and 42 of FIG. 3 are simultaneously on.

The output of dead time delay circuit 130 is applied to low side delay circuit 140 and, in turn, to low side driver 142 which is connected to pin $L_O$.

The output of dead time delay circuit 126 is applied to a level shift pulse generator 128 in the high side output line. The high side line also includes a dv/dt filter circuit 134 which filters noise from the pulse passed by pulse generator 128. The supply to the dv/dt filter 134 is connected to pin $V_B$.

The output of the dv/dt filter 134 is applied to latch circuit 136 whose output is connected to buffer 138 which contains gain stages and which drives pin $H_O$. Note that pin $V_S$ is connected to circuits 134, 136, 138.

The invention maintains all of these functions within the IC, which exist as in the IR2155 and IR2151ICs described in the above-noted patents of the present assignee, but also adds a novel shutdown feature using the $C_T$ pin. According to the invention, two additional circuit blocks have been added: (1) a third $C_T$-sensing comparator 118, and (2) a shutdown latch circuit 124. Input pin $C_T$ is connected to the negative input of the third comparator 118 which senses when the $C_T$ pin voltage is less than a predetermined threshold, denoted as VR3, that is supplied by divider 112. The third comparator 118 then supplies its output to the shutdown latch 124 and to the low side dead time delay circuit 130. The output of the shutdown latch is supplied, in turn, to the input of the high side dead time delay circuit 126.

Figure 6:
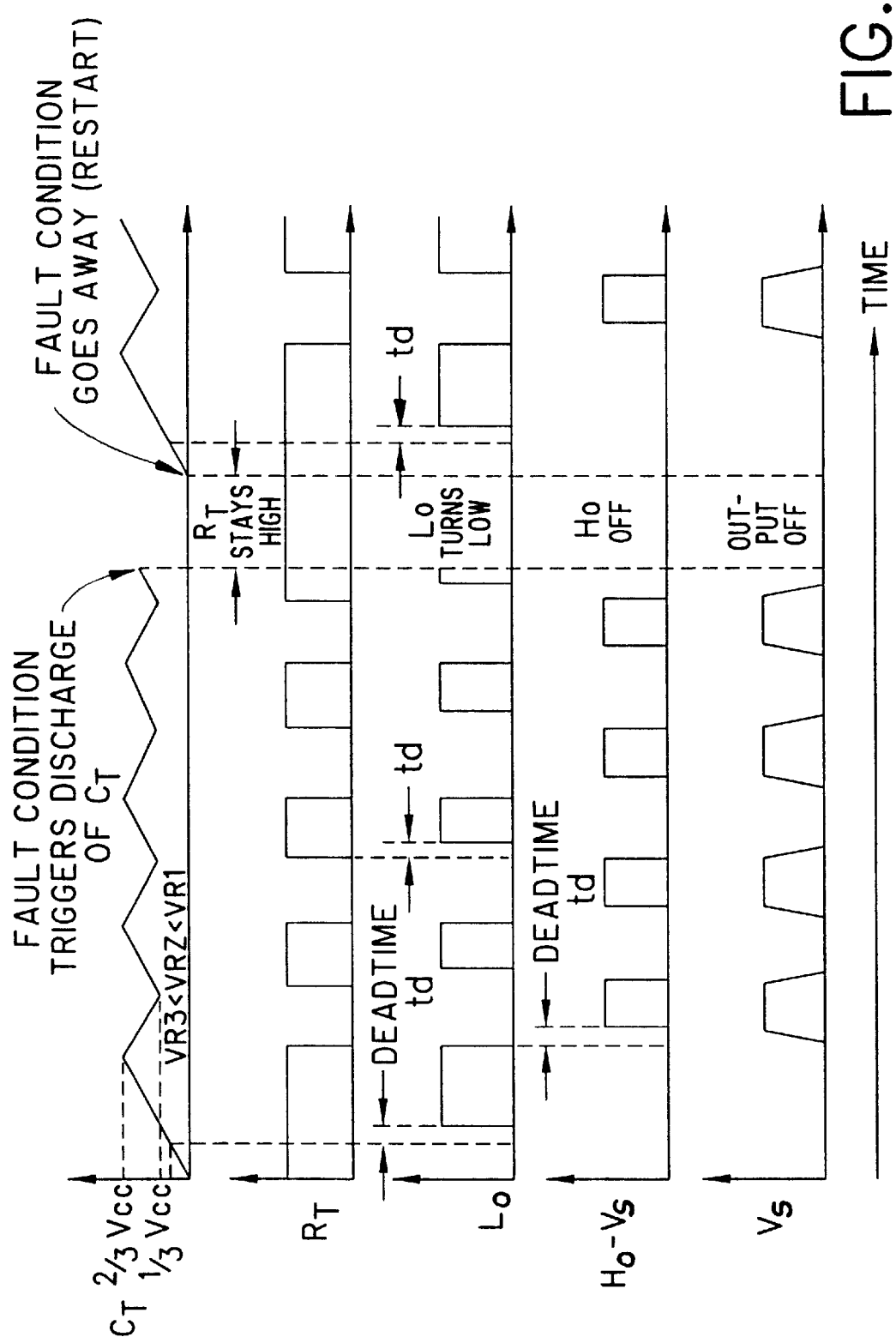
FIG. 6 shows the waveforms of the lamp driver integrated circuit shown in FIG. 5.

The threshold voltage VR3 at which the third comparator 118 changes state is chosen to be less than the lower of the threshold voltage VR2 used for self-oscillation. An example of the operation is illustrated in FIG. 6. Here, the values of VR1 and VR2 are chosen to be ⅔ $V_{CC}$ and ⅓ $V_{CC}$, respectively, and the value of VR3 is chosen to be ⅙ $V_{CC}$ primarily for convenience. Other particular ratios could be chosen, as long as VR3<VR2<VR1.

FIG. 6 depicts how the $C_T$-pin voltage regulates the operation of the outputs. At system startup, all of the IC input and output node voltages and currents are initially zero. The rectifier 10 (see FIG. 3) will quickly develop a dc bus voltage (e.g., +320 V) and cause capacitor 12 to charge up through resistor 18. Capacitor 12 supplies a voltage to the $V_{CC}$ terminal of the IC 30, which in turn supplies power to all of the internal circuits of IC 30.

When sufficient voltage is developed on capacitor 12, the UVLO block 122 (see FIG. 5) presets many of the other circuits in a desired state. Specifically, (1) the gate driver output LO is held low to prevent unwanted conduction of the power MOSFET 42, (2) the $R_T$ pin is set high (to the $V_{CC}$ potential), (3) the $C_T$ pin begins to charge and (4) the bias circuit block 132 is set in a "micropower" mode, where most of the IC circuit blocks are unbiased. This "micropower" startup mode is desirable because it reduces the current requirement from startup resistor 18, which enables the user to use a higher valued, lower wattage resistor (i.e., power consumption is reduced). Much like the circuit block UVLO 122, circuit block HS latch 132 ensures that for a VB-to-Vs potential of less than a preset, designed voltage level (e.g., 8.5 V), and that output HO is held at the Vs level, preventing unwanted conduction of the upper power MOSFET 40.

When the $C_T$-pin voltage exceeds VR3, (1) the low-side gate driver output voltage LO goes high after a dead time delay $t_d$, turning on the low side power MOSFET 42, (2) the bias current block 132 is instructed to supply power to the oscillator comparators NCOMP 114, PCOMP 116 and COMP 118 and the dead time circuits TDEADH 126 and TEADL 130, (3) the $R_T$ pin is held high by the oscillator latch 124, and (4) the $C_T$ pin continues to charge up through the resistor 16.

During normal operation, after the $C_T$-pin voltage exceeds VR3, self-oscillation occurs, and the output of the half-bridge circuit $V_S$ toggles with a trapezoidal shaped output.

When the $C_T$ pin reaches ⅔0 ×$V_{CC}$, the NCOMP comparator 114 gives a negative reset signal to the RSLATCH 120. This negative reset signal causes the outputs ($R_T$ and its complement $R_T$/N) of the RSLATCH 120 to reverse logic states, and the $R_T$ pin goes low ($R_T$/N goes high). In this particular embodiment of the IC 30, the $R_T$ pin drives the low-side signal path to LO, and is in phase with this output. Note that the phase relationship between $R_T$ and LO is arbitrary; certain users of this IC will require $R_T$ to be out of phase with $R_T$, even though LO will need to come on first during startup. As a result, when $R_T$ goes low, the LO output is driven low, turning off the low-side power MOSFET 42. The signal path from $R_T$ to LO is intentionally made as fast as possible (minimum delay), and is designed to accurately match the turn-off propagation delay from $R_T$/N to HO. This ensures that a propagation delay mismatch between the high-side and low-side drivers does not systematically offset the duty cycle at the output Vs of the half-bridge from its desired 50% level.

When $R_T$ switches logic levels from high to low, $R_T$/N (the second RSLATCH 120 output) goes high. This latter signal drives the high-side dead time circuit TDEADH 126, which drives the pulse generator PGEN 128, which level shifts the high-side on/off signals to the high-side circuitry.

The dead time circuits are designed to generate a small delay (e.g., 1 μsec) to the "turn-on" signal in order to (1) provide a cross-conduction dead time for the power MOSFETs 40 and 42, and (2) facilitate zero-voltage switching techniques for drive frequencies above the L-C resonant frequency (where the load impedance is inductive). Conversely, these dead time circuits are designed to add as little delay as possible to the "turn-off" signals to the gate drivers 138 and 142. After the high-side dead time circuit TDEADH 126 timeout period (e.g., 1 μsec), the pulse generator PGEN 128 is given the logic signal to translate a "turn-on" signal to the high-side gate driver 138. The DV/DT circuit 134 discriminates short pulses (e.g., 50–200 nsec) emitted by the pulse generator, and translates these pulses into "set" and "reset" signals for the HSLATCH 136. $R_T/N$ going high corresponds to a "set" signal at the input to the HSLATCH, which in turn gives the HSDRIVER 138 circuit the command to drive the HO output high.

Another result of the $R_T$ pin switching from a high to a low potential is that the resistor 16 begins to discharge the capacitor 14 from the $\frac{2}{3}$ Vcc threshold (set by the DIVIDER 112 block) downward to the $\frac{1}{3}$ Vcc threshold (also set by the DIVIDER 112 block). Upon reaching the $\frac{1}{3}$ Vcc threshold, the PCOMP comparator 116 output goes high, giving a "set" signal to the RSLATCH 120. This "set" signal drives $R_T$ high, $R_T/N$ low, and results in the output of the half-bridge Vs going low. The antiphase relationship between $R_T$ and $C_T$ results in self-oscillation at a 50% duty cycle, independent of the Vcc potential and temperature. This duty cycle control, combined with carefully matched turn-off propagation delays from $R_T$ to LO and $R_T/N$ to HO, respectively, result in a 50% duty cycle at the output of the half-bridge Vs.

If, during normal operation, a fault occurs which triggers the discharge of the capacitor 14, both of the gate driver outputs are disabled, and the output of the half-bridge stops oscillating. The $R_T$-pin voltage stays high to accommodate an automatic restart once the fault condition terminates.

If the fault condition is the removal of the lamp, and the circuit of FIG. 3 is used, the $C_T$ pin is discharged, and both gate driver outputs shut down. When the lamp is replaced, the transistor 60 shown in FIG. 3 turns off, and the capacitor 14 again charges up.

The automatic restart function is accomplished by the shutdown latch 124 in FIG. 5 and the lamp user need not cycle the lamp power switch to restart the system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An integrated circuit formed in a silicon substrate for driving first and second MOS gated power semiconductor devices which are connected in a half bridge circuit which has first and second d-c terminals and which has a common terminal located at a node between said first and second MOS gated power semiconductor devices, the common terminal for supplying an output signal to a load circuit; said integrated circuit comprising:

a timer circuit having an input control terminal which is connected to a low logic level signal;

a first latch circuit coupled to said timer circuit for controlling the frequency at which said first and second MOS gated power semiconductor devices are switched on and off and for supplying an output which is switched in response to said signal applied to said input control terminal;

a high side dead time delay circuit and a low side dead time delay circuit each coupled to said first latch circuit for delaying transmission of said latch output signal for a time delay interval following the switching of said output of said first latch circuit to prevent simultaneous conduction of said first and second MOS gated power semiconductor devices;

a high side driver circuit and a low side driver circuit coupled to said high side dead time circuit and said low side dead time circuit, respectively, and having high side and low side output terminals, respectively, which supply high side and low side outputs for turning on and off said first and second MOS gated power semiconductor devices, respectively, in response to said signals supplied to said input control terminal; and a shutdown circuit coupled to said low logic level signal for preventing said supply of said high side and low side outputs when said low logic level signal is less than a threshold voltage.

2. The integrated circuit of claim 1 wherein said shutdown circuit comprises a threshold voltage sensing circuit coupled to said low logic level signal and a second latch circuit coupled to said sensing circuit for supplying an output to said high side and low side dead time delay circuits.

3. The integrated circuit of claim 1 wherein said threshold voltage is less than the lowest value of said low logic level signal at which said high side and said low side outputs are ordinarily supplied to said first and second MOS gated power semiconductor devices.

4. The integrated circuit of claim 1 wherein said shutdown circuit prevents said high side and low side dead time delay circuits from transmitting said latch output signal when said low logic level signal is less than said threshold voltage.

5. The integrated circuit of claim 1 wherein said timer circuit has a second input control terminal for controlling the frequency at which said MOS gated power semiconductor devices are turned on and off; said first and second input control terminals being connected to an external timing capacitor and an external timing resistor for setting the oscillation frequency of said timing circuit.

6. A circuit for driving a load circuit from a dc bus supply, said circuit comprising:

first and second MOS gated power semiconductor devices connected in a half bridge configuration which has first and second d-c terminals coupled across the d-c bus supply and having a common terminal at the node between said first and second MOS gated power semiconductor devices for supplying an output signal to the load circuit; and a self oscillating driver circuit having first and second outputs for driving said first and second MOS gated power semiconductor devices, respectively, a dead time delay circuit for preventing the simultaneous driving of said first and second MOS gated power semiconductor devices by delaying the turning on of one of said first and second MOS gated power semiconductor devices for a time delay interval after the turning off of another one of said first and second MOS gated power semiconductor devices, and a shutdown circuit coupled to said low logic level signal for preventing said supply of said high side and low side outputs for turning on and off said first and second MOS gated power semiconductor devices when said low logic level signal is less than a threshold voltage.

7. The circuit of claim 6 wherein said shutdown circuit comprises a threshold voltage sensing circuit coupled to said low logic level signal and a second latch circuit coupled to said sensing circuit for supplying an output to said high side and low side dead time delay circuits.

8. The circuit of claim 6 wherein said threshold voltage is less than the lowest value of said low logic level signal at which said high side and said low side outputs are ordinarily supplied to said first and second MOS gated power semiconductor devices.

9. The circuit of claim 6 wherein said shutdown circuit prevents said high side and low side dead time delay circuits from transmitting said latch output signal when said low logic level signal is less than said threshold voltage.

10. The circuit of claim 6 further comprising a series LC circuit coupled across said common terminal and a ground terminal; wherein the oscillating frequency of the load circuit is controlled by the resonant frequency of said series LC circuit.

11. A circuit for driving a gas discharge illumination device, said circuit comprising:
   first and second MOS gated power semiconductor devices connected in a half bridge configuration which has first and second d-c terminals coupled across a dc bus supply and having a common terminal at the node between said first and second MOS gated power semiconductor devices for supplying an output signal to the illumination device; and
   a self oscillating driver circuit having first and second outputs for driving said first and second MOS gated power semiconductor devices, respectively, a dead time delay circuit for preventing the simultaneous driving of said first and second MOS gated power semiconductor devices by delaying the turning on of one of said first and second MOS gated power semiconductor devices for a time delay interval after the turning off of another one of said first and second MOS gated power semiconductor devices, and a shutdown circuit coupled to said low logic level signal for preventing said supply of said high side and low side outputs for turning on and off said first and second MOS gated power semiconductor devices when said low logic level signal is less than a threshold voltage.

12. The circuit of claim 11 wherein said shutdown circuit comprises a threshold voltage sensing circuit coupled to said low logic level signal and a second latch circuit coupled to said sensing circuit for supplying an output to said high side and low side dead time delay circuits.

13. The circuit of claim 11 wherein said threshold voltage is less than the lowest value of said low logic level signal at which said high side and said low side outputs are ordinarily supplied to said first and second MOS gated power semiconductor devices.

14. The circuit of claim 11 wherein said shutdown circuit prevents said high side and low side dead time delay circuits from transmitting said latch output signal when said low logic level signal is less than said threshold voltage.

* * * * *